United States Patent
Masuda et al.

(10) Patent No.: US 7,894,149 B2
(45) Date of Patent: Feb. 22, 2011

(54) DISC DRIVE DEVICE

(75) Inventors: Hiroyasu Masuda, Kanagawa (JP);
Yoshihiko Maeda, Kanagawa (JP);
Kenichi Kuramoto, Kanagawa (JP);
Masayuki Kurita, Kanagawa (JP);
Kenji Kuroki, Kanagawa (JP)

(73) Assignee: Hitachi Global Storage Technologies, Netherlands, B.V., Amsterdam (NL)

( * ) Notice: Subject to any disclaimer, the term of this patent is extended or adjusted under 35 U.S.C. 154(b) by 199 days.

(21) Appl. No.: 12/322,026

(22) Filed: Jan. 27, 2009

(65) Prior Publication Data

US 2009/0201598 A1    Aug. 13, 2009

(30) Foreign Application Priority Data

Feb. 2, 2008    (JP)    ............... 2008-023405

(51) Int. Cl.
*G11B 27/36* (2006.01)
*G11B 20/10* (2006.01)
*G11B 21/02* (2006.01)

(52) U.S. Cl. ............... 360/31; 360/39; 360/75
(58) Field of Classification Search ........................ None
See application file for complete search history.

(56) References Cited

U.S. PATENT DOCUMENTS 5,168,413 A    12/1992   Coker et al.
6,906,878 B2    6/2005   Smith et al.
7,136,240 B2 *  11/2006  Yoshida et al. ............. 360/39
7,468,856 B2 * 12/2008   Fitzpatrick et al. ......... 360/75
7,602,573 B2 * 10/2009   Yang ........................... 360/75
2006/0126204 A1 * 6/2006 Taniguchi et al. ........... 360/31

FOREIGN PATENT DOCUMENTS

JP    2000-195210    7/2000

\* cited by examiner

*Primary Examiner*—Daniell L Negrón
*Assistant Examiner*—Regina N Holder (57) ABSTRACT

Embodiments of the present invention precisely measure clearance variation by temperature change using a value in a RW channel. In an embodiment of the present invention, an HDD measures resolution by signals in a RW channel. The measured resolution shows variations depending on temperature according to two factors. One factor is the clearance variation depending on the temperature and the other is the variation in operational property of the RW channel depending on the temperature. The HDD compensates for the temperature variation of the resolution according to the two factors. The HDD uses two kinds of sensed temperature. One corresponds to the temperature inside an enclosure in which head sliders are provided and the other corresponds to the temperature of the chip in which the RW channel is implemented. Sensing the drive temperature and the channel temperature independently achieves precise compensation for the variation in the measured resolution caused by clearance variation and channel property.

21 Claims, 9 Drawing Sheets

DISC DRIVE DEVICE

CROSS-REFERENCE TO RELATED APPLICATION

The instant nonprovisional patent application claims priority to Japanese Patent Application No. 2008-023405 filed Feb. 2, 2008 and which is incorporated by reference in its entirety herein for all purposes.

BACKGROUND OF THE INVENTION

Disk drive devices using various kinds of disks, such as optical disks, magneto-optical disks, flexible magnetic disks, and the like have been known in the art. In particular, hard disk drives (HDDs) have been widely used as storage devices of computers and have been one of the indispensable storage devices for current computer systems. Moreover, HDDs have found widespread application to moving image recording/reproducing apparatuses, car navigation systems, cellular phones, and the like, in addition to the computers, due to their outstanding characteristics.

Magnetic disks used in HDDs have multiple concentric data tracks and servo tracks. Each servo track is constituted by a plurality of servo data containing address information. Each data track includes multiple data sectors containing user data recorded thereon. Data sectors are recorded between servo data located discretely in the circumferential direction. A head element portion of a head slider supported by a swing actuator accesses a desired data sector in accordance with address information in the servo data to write data to and retrieve data from the data sector.

To increase recording density of a magnetic disk, it is important to decrease the clearance between a head element portion flying over a magnetic disk and the magnetic disk. Some mechanisms have been proposed to control the clearance. One of such mechanisms has a heater in a head slider; the heater heats the head element portion to adjust the clearance. In the present specification, this mechanism is referenced as thermal fly-height control (TFC). The TFC generates heat by applying electric current to the heater to make the head element portion protrude by thermal expansion. This reduces the clearance between the magnetic disk and the head element portion.

The clearance varies with barometric pressure (altitude) as well as temperature. If the clearance preset value in a read/write operation is 5 nm or more, the clearance variation caused by an altitude change can be absorbed by a clearance margin. However, if the clearance is not more than 2 or 3 mm in a read/write operation, clearance control for a pressure change in addition to a temperature change is demanded.

Typical TFC makes a head element portion protrude due to thermal expansion by increasing heater power in response to a decrease in temperature to compensate for the increase in clearance caused by the decrease in temperature. In contrast, as the altitude gets higher and the barometric pressure (hereinafter, referred to as pressure) becomes lower, the fly-height of a slider lowers. The lowered pressure reduces the clearance between the head element portion and the magnetic disk. Therefore, if the temperature is constant, the TFC decreases the protruding amount with decrease in pressure.

An HDD has a number of preset parameters for temperature; accurate temperature sensing is indispensable for normal operation of the HDD. Therefore, a common HDD comprises a temperature sensor as a means to sense the temperature. A barometric sensor (altitude sensor) has been known as a means for sensing the pressure. However, use of a barometric sensor increases the number of components in the HDD and the cost of the HDD as well significantly. Since there are few parameters to be set for pressure change except for the parameters for clearance control, it is preferable to determine the pressure without a barometric sensor.

As described above, the clearance varies with pressure. Accordingly, a variation in pressure can be measured by referring to the clearance. Some techniques to determine a clearance have been known. A typical technique determines a clearance (a variation in clearance) from the amplitudes of read signals of a head element portion. One of the methods for determining a precise clearance using the amplitude of read signals determines the clearance from the resolution of frequency components having different amplitudes of read signals.

For clearance control depending on pressure without a barometric sensor, it is demanded to determine clearance variation by referring to read signals of the head slider and then to determine pressure variation from the clearance variation. The clearance, however, varies with temperature. Accordingly, to determine a pressure variation from a clearance variation, it is demanded to compensate for the component of the clearance variation caused by a temperature change.

As described above, the clearance can be precisely measured from the resolution. Among some existing method to measure the resolution, a method has been known to determine the resolution from values used in digital signal processing in a read-write channel (RW channel) (for example, refer to Japanese Patent Publication No. H5-81807 "Patent Document 1"). A controller of an HDD obtains the above-mentioned digital values from the RW channel and determines the resolution from the values.

As described above, the resolution varies depending on clearance which varies with temperature. Specifically, as the clearance decreases, the resolution increases. However, it has been found that, when the resolution is measured by using values in the RW channel as described above, the measured resolution varies with temperature due to factors other than the clearance variation. Thus, the operation in the RW channel is affected by temperature so that the measured resolution is varied by the change in the operational property.

Figure 10:
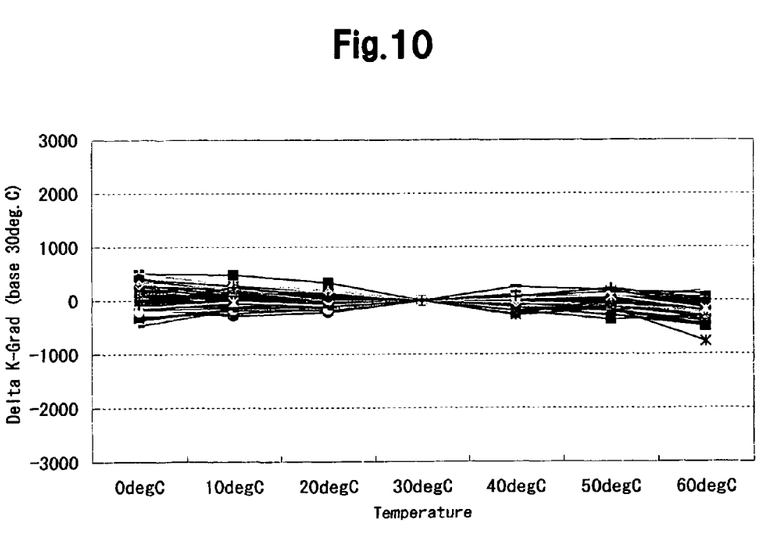
FIG. 10 shows the measured data indicating the relationship between Kgrad and the temperature in an HDD in a conventional technique.

FIG. 10 shows the measured data indicating the relationship between the specific value representing the resolution in the RW channel (the value referenced as Kgrad below) and the temperature in the HDD. Setting the specific value at 30° C. for the default, the temperature in the HDD and the specific value were measured. The X-axis represents temperature, and the Y-axis represents variation in the specific value. The specific value represents the resolution and is used in the digital signal processing in the RW channel. Since the clearance decreases with rising in temperature, it is assumed that the resolution should increase with rising in temperature. However, the measured data shown in FIG. 10 do not show such change. The variation in the measured value caused by operational property change of the RW channel has balanced out the variation in the measured value caused by clearance change.

Figure 11:
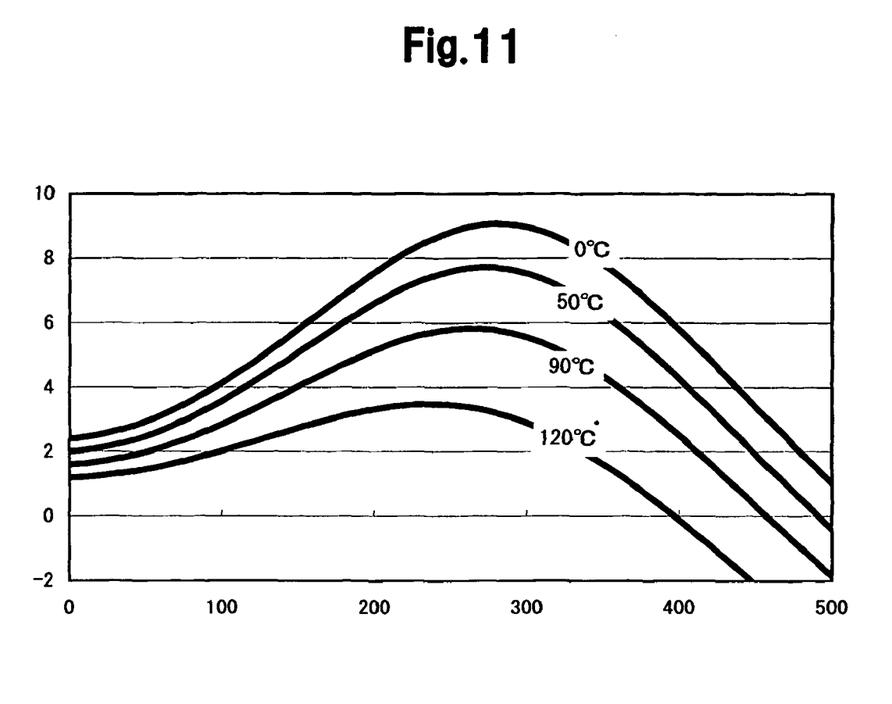
FIG. 11 shows temperature variations in the gain of a waveform equalization filter in a conventional technique.

Studying the circuit configuration in the RW channel, it has been found that a waveform equalization filter (low-pass filter) particularly shows remarkable property change depending on temperature, which significantly affects the measurement of resolution. The waveform equalization filter is a pre-step circuit of the AD converter in the RW channel and has a gain property depending on frequency. The gain property changes with the temperature of the RW channel. FIG. 11 shows change in the gain of the waveform equalization filter depending on temperature; the X-axis represents frequency, the Y-axis represents gain, and each graph represents the measured values at a different temperature. As shown in FIG. 11, the gain of the filter decreases at all of the frequencies as the temperature rises, and the decrease in gain at higher frequencies is greater.

Resolution can be expressed by the ratio between the high frequency components and low frequency components of signals. Accordingly, the measured resolution is decreased by the above-described property change of the low-pass filter caused by rising in temperature. On the other hand, the clearance decreases with rising in temperature and the measured resolution caused thereby increases. Accordingly, the variation in the measured resolution is smaller, comparing with the clearance variation by temperature change. For all of the above reasons, to measure the resolution using the value in the RW channel and precisely measure the clearance variation from the resolution, it is demanded to correctly compensate for the variation in the measured resolution which is caused by property change of the RW channel depending on temperature.

BRIEF SUMMARY OF THE INVENTION

Figure 1:
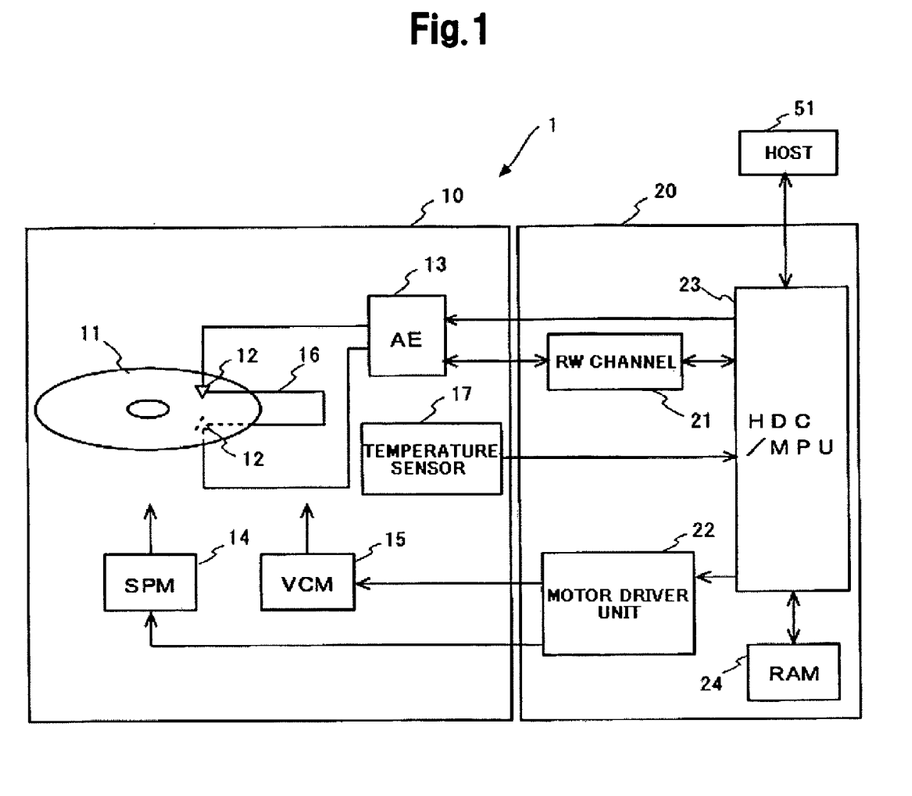
FIG. 1 is a block diagram schematically illustrating an entire configuration of an HDD 1 in one embodiment.

Embodiments of the present invention precisely measure clearance variation by temperature change using a value in a RW channel. In the embodiment of FIG. 1, an HDD 1 measures resolution by signals in a RW channel. The measured resolution shows variations depending on temperature according to two factors. One factor is the clearance variation depending on the temperature and the other is the variation in operational property of the RW channel depending on the temperature. The HDD compensates for the temperature variation of the resolution according to the two factors. The HDD uses two kinds of sensed temperature. One corresponds to the temperature inside an enclosure in which head sliders are provided and the other corresponds to the temperature of the chip in which the RW channel is implemented. Sensing the drive temperature and the channel temperature independently achieves precise compensation for the variation in the measured resolution caused by clearance variation and channel property.

DETAILED DESCRIPTION OF THE INVENTION

Embodiments of the present invention relate to disk drive devices, and more particularly, relate to temperature compensation in clearance measurement using a parameter in a channel circuit.

A disk drive device according to an aspect of embodiments of the present invention comprises a disk, a head for accessing the disk, a channel circuit for decoding read signals reproduced from the disk by the head, a first circuit to be utilized in sensing a first temperature which is the temperature in an enclosure, a second circuit to be utilized in sensing a second temperature which is the temperature in the vicinity of the channel circuit, and a controller for performing a compensation of a parameter in processing the read signals in the channel circuit using the first temperature and the second temperature and for measuring a clearance between the head and the disk using the compensated parameter.

The controller compensates for variation in the parameter corresponding to a temperature change of frequency property of the channel circuit by the compensation of the parameter. Moreover, a coefficient to be used in the compensation of the parameter is determined by a test under at least two temperature conditions. Besides, the parameter is a parameter representing resolution of the signals reproduced from the disk by the head.

The parameter is a parameter in digital signal processing in the channel circuit. The controller determines the second temperature using an output of the second circuit and a preset function. Moreover, the second circuit comprises a channel oscillator, and the output of the second circuit is an oscillation frequency of the channel oscillator.

A disk drive device according to another aspect of embodiments of the present invention comprises a disk, a head for accessing the disk, a channel circuit for decoding read signals reproduced from the disk by the head, a first circuit to be utilized in sensing a first temperature which is the temperature in an enclosure, a second circuit to be utilized in sensing a second temperature which is the temperature in the vicinity of the channel circuit, and a controller for performing a compensation of a parameter in processing the read signals in the channel circuit using the first temperature and the second temperature and for measuring barometric pressure using the compensated parameter.

The controller compensates for variation in the parameter corresponding to a temperature change of frequency property of the channel circuit by the compensation of the parameter. Moreover, a coefficient to be used in the compensation of the parameter is determined by a test under at least two temperature conditions. Besides, the parameter is a parameter representing resolution of the signals reproduced from the disk by the head.

The parameter is a parameter in digital signal processing in the channel circuit. The controller determines the second temperature using an output of the second circuit and a preset function. Moreover, the second circuit comprises a channel oscillator, and the output of the second circuit is an oscillation frequency of the channel oscillator.

A disk drive device according to yet another aspect of embodiments of the present invention comprises a disk, a head equipped with a heater for accessing the disk, a channel circuit for decoding read signals reproduced from the disk by the head, a first circuit to be utilized in sensing a first temperature which is the temperature in an enclosure, a second circuit to be utilized in sensing a second temperature which is the temperature in the vicinity of the channel circuit, and a controller for performing a compensation of a parameter in processing the read signals in the channel circuit using the first temperature and the second temperature and for determining a heater power to be supplied to the heater when the head accesses the disk based on a barometric pressure which was measured by use of the compensated parameter.

The controller compensates for variation in the parameter corresponding to a temperature change of frequency property of the channel circuit by the compensation of the parameter. Moreover, a coefficient to be used in the compensation of the parameter is determined by a test under at least two temperature conditions. Besides, the parameter is a parameter representing resolution of the signals reproduced from the disk by the head.

The parameter is a parameter in digital signal processing in the channel circuit. The controller determines the second temperature using an output of the second circuit and a preset function. Moreover, the second circuit comprises a channel oscillator, and the output of the second circuit is an oscillation frequency of the channel oscillator.

According to embodiments of the present invention, the clearance or a value corresponding thereto can be measured more precisely using a parameter in a channel circuit.

Hereinafter, particular embodiments to which the present invention has been applied will be described. For clarity of explanation, the following description and the accompanying drawings contain omissions and simplifications as appropriate. Throughout the drawings, like components are denoted by like reference numerals, and their repetitive description is omitted for clarity of explanation if not necessary. Hereinafter, particular embodiments of the present invention will be described by way of example of a hard disk drive (HDD), which is an example of a disk drive device.

An HDD according to one embodiment controls the clearance between a head element portion and a magnetic disk of an example of a disk by means of thermal fly-height control (TFC). The TFC adjusts the clearance by thermal expansion of a head element portion caused by heat from a heater in a slider. The HDD of the an embodiment adjusts the clearance in response to barometric pressure change. The HDD measures the clearance using read signals. The HDD conducts temperature compensation for clearance variation to remove the clearance variation caused by temperature change. The HDD determines the pressure variation from the temperature-compensated clearance variation and supplies the heater power corresponding to the pressure variation.

The HDD according to an embodiment measures clearance variation using the resolution of read signals. In particular, the HDD measures the resolution by signals in a read-write channel (RW channel). The measured resolution shows change depending on temperature due to two factors. One is clearance change depending on temperature and the other is the operational property change of the RW channel depending on temperature. The HDD compensates for the temperature variation in the resolution caused by these two factors. Thereby, resolution variation depending on pressure can be precisely determined.

To precisely compensate for the variation in measured resolution caused by the above two factors, the HDD uses two kinds of sensed temperature. One corresponds to the temperature (drive temperature) inside an enclosure in which a head slider is provided, and the other is the temperature in the vicinity of a RW channel, which corresponds to the temperature (channel temperature) of the chip where the RW channel is implemented. The channel temperature varies by the heat caused by the chip's operation in addition to the environment temperature and shows different variation from the drive temperature. Accordingly, the HDD comprises a circuit for sensing the channel temperature in addition to a circuit for sensing the drive temperature. Separate sensing of the drive temperature and the channel temperature achieves precise compensation for the clearance variation and the variation in measured resolution caused by channel property change.

Before describing details of the method of the temperature compensation of the resolution according to one embodiment, an HDD and its head slider will be outlined. FIG. 1 is a block diagram schematically depicting an entire configuration of an HDD 1. The HDD 1 comprises a magnetic disk 11, a disk for storing data, inside an enclosure 10. A spindle motor (SPM) 14 rotates the magnetic disk 11 at a specific angular rate. Head sliders 12 are provided to access (read or write) the magnetic disk 11; each of them corresponds to each recording surface of the magnetic disk 11. Each head slider 12 comprises a slider for flying over the magnetic disk and a head element portion fixed on a slider for converting magnetic signals to and from electric signals.

Each of the head sliders 12 according to the present embodiment comprises a heater for the TFC to make the head element portion expand and protrude by heat and adjust the clearance between the head element portion and the magnetic disk 11. Each of the head slider 12 is fixed to a tip end of an actuator 16. The actuator 16, which is coupled to a voice coil motor (VCM) 15, pivots about a pivotal shaft to move the head sliders 12 above the rotating magnetic disk 11 in its radial direction. The actuator 16 and the VCM 15 are moving mechanisms of the head sliders 12.

On a circuit board 20 fixed outside the enclosure 10, circuit elements are mounted. A motor driver unit 22 drives the SPM 14 and the VCM 15 in accordance with control data from an HDC/MPU 23. A RAM 24 functions as a buffer for temporarily storing read data and write data. An arm electronics (AE) 13 inside the enclosure 10 selects a head slider 12 to access the magnetic disk 11 from multiple head sliders 12, amplifies reproduction signals therefrom to send them to a read-write channel (RW channel) 21. Further, it sends recording signals from the RW channel 21 to the selected head slider 12. The AE 13 further supplies the heater of the selected head slider 12 with electric power and functions as an adjusting circuit for adjusting the electric energy.

The RW channel 21, in read operation, amplifies read signals supplied from the AE 13 to have specific amplitudes, extracts data from the obtained read signals, and performs a decoding process. The retrieved data includes user data and servo data. The decoded read user data and servo data are supplied to the HDC/MPU 23. The RW channel 21, in write operation, code-modulates write data supplied from the HDC/MPU 23, converts the code-modulated data into write signals, and then supplies them to the AE 13.

The HDC/MPU 23, an example of a controller, performs entire control of the HDD 1 in addition to necessary processes concerning data processing such as read/write operation control, command execution order management, positioning control of the head sliders 12 using servo signals (servo control), interface control to and from a host 51, defect management, and error handling operations when any error has occurred. In addition, the HDC/MPU 23 according to the present embodiment measures temperature in the enclosure by a temperature sensor mounted in the enclosure 10 and performs TFC in accordance with the temperature sensed by a temperature sensor 17. The HDC/MPU 23 performs further TFC in accordance with the pressure. Typically, the temperature sensor 17 such as a thermistor is implemented on the same board as the AE 13 in the vicinity of the pivotal shaft of the actuator 16. In this regard, as long as the temperature inside the enclosure can be measured, the temperature sensor 17 may be mounted outside the enclosure.

Figure 2:
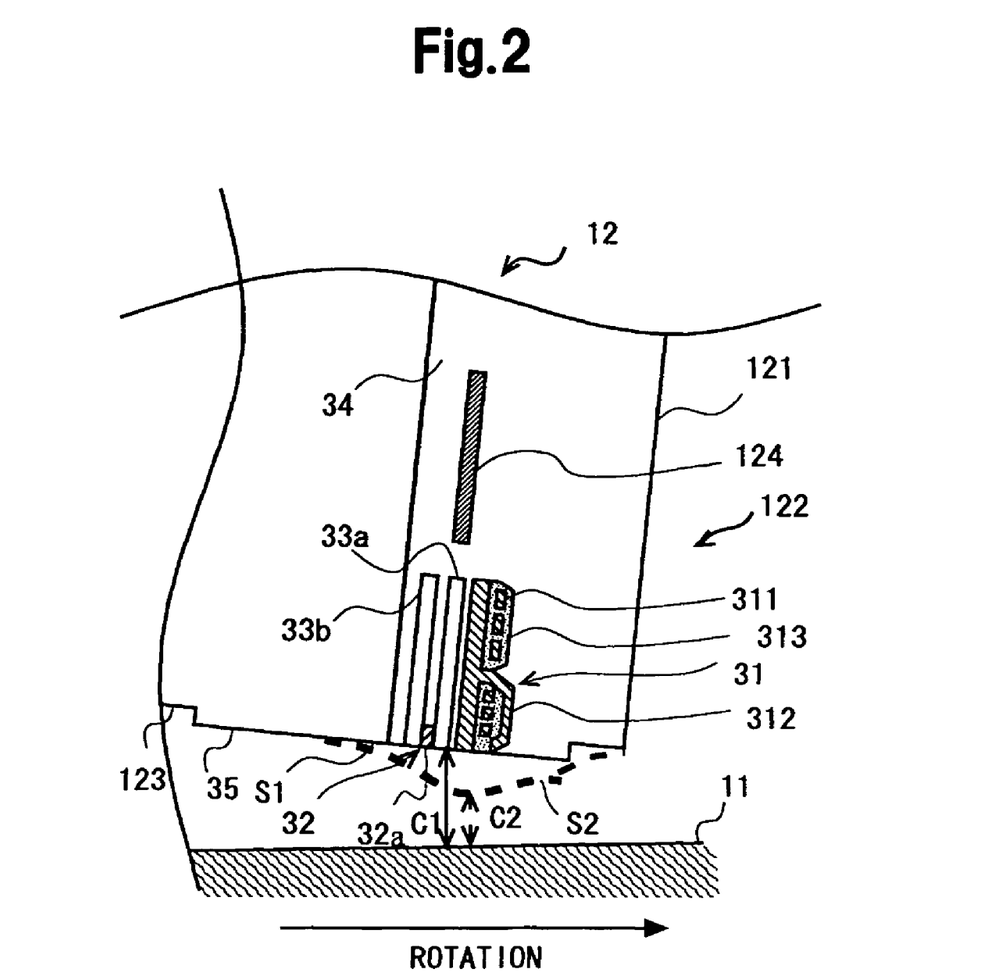
FIG. 2 is a cross-sectional view schematically illustrating a structure of a head slider having a heater for TFC in one embodiment.

FIG. 2 is a cross-sectional view illustrating a configuration in the vicinity of an air flowing out end surface (trailing side end surface) 121 of a head slider 12. A slider 123 supports a head element portion 122. The head element portion 122 comprises a read element 32 and a write element 31. The write element 31 generates magnetic fields between magnetic poles 312 by electric current flowing across a write coil 311 to write magnetic data onto the magnetic disk 11. The read element 32 has a magnetoresistive element 32a having magnetic anisotropy and retrieves magnetic data by means of resistance varying with magnetic fields from the magnetic disk 11.

The head element portion 122 is formed on an AlTiC substrate constituting the slider 123 by a thin film deposition process. The magnetoresistive element 32a is sandwiched between magnetic shields 33a and 33b. The write coil 311 is surrounded by an insulating film 313. A protective film 34 made of alumina or the like is formed around the write element 31 and the read element 32. A heater 124 is present in the vicinity of the write element 31 and the read element 32. The heater 124 can be formed by winding a thin film resistive element using permalloy or the like and filling the gap with alumina.

When the AE 13 supplies the heater 124 with electric power, the vicinity of the head element portion 122 is deformed to protrude by the heat of the heater 124. For example, in non-heating, the shape of the ABS 35 of the head slider 12 is indicated by S1 and the clearance which is a distance between the head element portion 122 and the magnetic disk is indicated by C1. The protruding shape S2 in heating the heater 124 is indicated by a dashed line. The head element portion 122 comes close to the magnetic disk 11 and the clearance C2 at this time is smaller than the clearance C1. The protruding amount of the head element portion 122 and the clearance vary in accordance with the heater power value supplied to the heater 124.

As described above, the HDC/MPU 23 of the present embodiment performs TFC depending on temperature and pressure. Heater power P to be applied to the heater 124 is expressed by the sum (P(t)+P (p)) of heater power P(t) depending on the temperature and heater power P(p) depending on the pressure. A constant term can be incorporated in any formula and the coefficients in formulae can be varied in accordance with environmental conditions such as temperature, pressure, and the like, the head slider 12, or its radial position.

The HDC/MPU 23 controls the heater power P in accordance with the temperature sensed by the temperature sensor 17. Specifically, the HDD 1 has data indicating the relationship between the sensed temperature and the heater power, and the HDC/MPU 23 determines a heater power depending on the temperature in accordance with the data and the sensed temperature. The relationship between the temperature and the heater power depends on the head slider 12, the radial position (or the zone) on a magnetic disk 11, and the pressure.

The HDD 1 of the present embodiment does not have a barometric sensor so that it cannot directly measure the pressure. Therefore, the HDC/MPU 23 measures the clearance to perform the TFC for the pressure. The clearance varies with pressure. Accordingly, the HDC/MPU 23 measures the clearance to determine the pressure variation dp from the clearance variation.

Since the clearance also varies with temperature, the HDC/MPU 23 compensates the measured clearance for the clearance variation induced by the temperature change to determine the clearance variation induced by the pressure change. Defining the default conditions at specific default temperature and pressure and the default clearance under the default conditions relates the variation in each value to the current value thereof.

The clearance variation after the temperature compensation indicates the pressure variation. The HDC/MPU 23 controls the heater power P in accordance with the pressure (pressure variation) determined by the clearance variation. Specifically, the HDD 1 has preset data indicating the relationship between the pressure variation indicated by clearance variation and the heater power; the HDC/MPU 23 determines the heater power for the pressure in accordance with the data and the measured pressure.

The HDD 1 of the present embodiment determines a clearance or a clearance variation from the default clearance from read signals of the head slider 12. More specifically, it determines a clearance from resolution (resolution of frequency components) of read signals. For example, the resolution can be expressed by the ratio between specific low-frequency signals and high-frequency signals in read signals.

There are some operational parameters for values corresponding to the clearance which correspond to pressure change or the clearance change induced by the pressure change; the determination of the clearance variation using resolution is one of the most accurate methods. As the clearance decreases, the amplitude of the high-frequency components in read signals increases to increase the signal resolving power, namely, resolution. Typically, the functions relating the resolution to the clearance are different in each head slider 12.

The HDC/MPU 23 can determine the resolution by analyzing read signals and calculating the ratio between the magnitude of high-frequency signals and the magnitude of low-frequency signals. However, the HDC/MPU 23 requires an additional function other than functions necessary in normal operation to execute the process. Also, it takes much process time for the MPU to execute the process. Therefore, the resolution may be measured using functions implemented in the HDD 1. The RW channel 21 has a function to modulate reproduction waveforms of read signals in order to accurately extract data from read signals. The RW channel 21 performs the waveform shaping using a digital filter.

Figure 3:
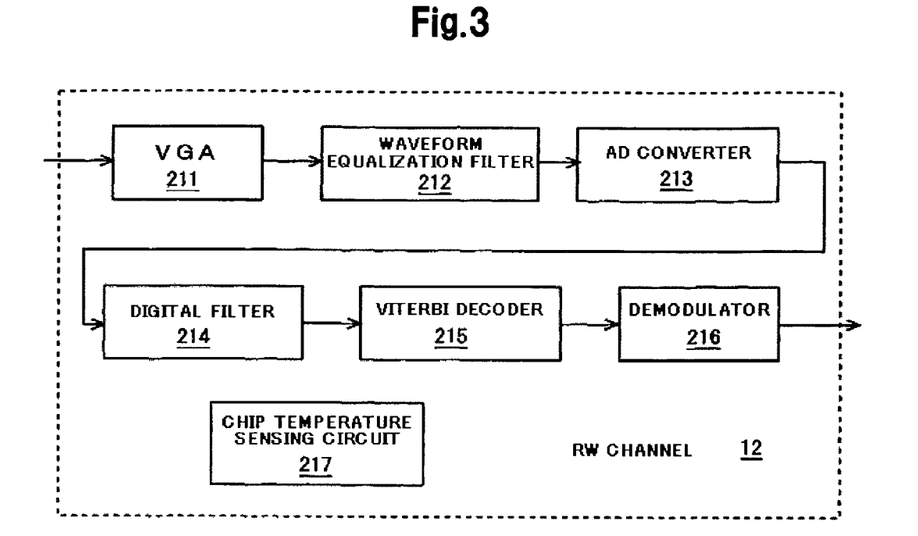
FIG. 3 is a block diagram schematically illustrating a circuit configuration in a RW channel in one embodiment.

FIG. 3 is a block diagram schematically illustrating the circuit configuration in the RW channel 21. The RW channel 21 comprises a variable gain amplifier (VGA) 211, a waveform equalization filter 212, an AD converter 213, a digital filter 214, a Viterbi decoder 215, and a demodulator 216. The output from the head slider 12 is sent to the waveform equalization filter 212 via the AE 13 and the VGA 211. The waveform equalization filter 212 equalizes waveforms of received analog signals. Specifically, the waveform equalization filter 212 has a function as a low-pass filter. The waveform equalization filter 212 removes noises from the received signals and equalizes waveforms for slimming the waveforms of the signals. The waveform equalization filter 212 can change parameters for reading out high-band gain, cut-off frequencies, and the like according to the control data from the HDC/MPU 23.

The output from the waveform equalization filter 212 is converted into digital signals by sampling and quantization of the AD converter 213 and sent to the digital filter 214. The digital filter 214 shapes the received waveforms to correctly restore the data and equalizes the received waveforms into the aimed waveform shapes (transversal equalization of digital signals). The output signals of the digital filter 214 are sent to the Viterbi decoder 215. The Viterbi decoder 215 decodes the received data. Specifically, the waveforms equalized by the digital filter 214 are processed in a partial response maximum likelihood (PRML) processing circuit and run length limited (RLL) signals are outputted. The Viterbi decoder 215 can determine the most probable data row from the connection in the received data row according to a specific algorithm. The demodulator 216 demodulates coded RLL signals into the original signals.

As to the digital filter 214 to be implemented in the RW channel 21, a digital filter for performing compensation of frequency components in reproducing signals has been known. The digital filter 214 comprises an FIR filter or a transversal filter and an adaptive cosign filter. The RW channel 21 performs compensation of the coefficient in the adaptive cosign filter, using the output from the digital filter 214 and the output from the Viterbi decoder 215. This compensation value is related to the clearance (resolution) by a linear function and represents the resolution. This digital filter is an existing technology as disclosed in Patent Document 1 and U.S. Pat. No. 5,168,413 (detailed explanations on the digital filter are omitted). Hereinafter, the compensation value is called Kgrad.

In the following description, the HDC/MPU 23 uses one of the channel parameters, Kgrad, as a value corresponding to resolution. The HDC/MPU 23 may use other channel parameters representing resolution. For example, if the RW channel 21 includes a digital filter for restoring a specific pattern of reproducing signals into a default pattern, the HDC/MPU 23 may use the compensation value of the resolution component in the compensation coefficient of the tap of the digital filter.

As shown in FIG. 3, the RW channel 21 includes a circuit 217 for sensing the chip temperature inside thereof. The HDC/MPU 23 measures the chip temperature with the circuit 217. For example, the RW channel 21 includes a temperature sensor for directly, sensing temperature as a temperature sensing circuit 217. The RW channel 21 is implemented in a semiconductor chip. The RW channel 21 may be implemented in a semiconductor chip together with other function blocks (for example, the HDC/MPU 23) or may be implemented in a semiconductor chip different from other function blocks. The chip in which the RW channel 21 is implemented may be packaged independently, or may be packaged with other chips.

To measure a pressure variation, the HDC/MPU 23 selects a specific head slider 12 to measure Kgrad using the head slider 12. Further, it performs temperature compensation of the measured Kgrad using the temperature sensor 17 in the enclosure and the chip temperature (channel temperature) sensing circuit 217. The HDC/MPU 23 performs this process at the start up, for example. Hereinafter, the temperature measured by the temperature sensor 17 which can directly measure temperature is called drive temperature.

Use of two measurement temperatures achieves precise removal of the amounts varied by changes in clearance and channel property (particularly the frequency property of the waveform equalization filter 212) to precisely measure Kgrad variation (clearance variation) caused by pressure change. Hereinafter, a specific method of the temperature compensation of Kgrad will be described. Coefficients required for the temperature compensation of Kgrad are stored in the management area of a magnetic disk 11 or a non-volatile semiconductor memory (not shown). The HDC/MPU 23 stores the history of the temperature compensation.

Figure 4:
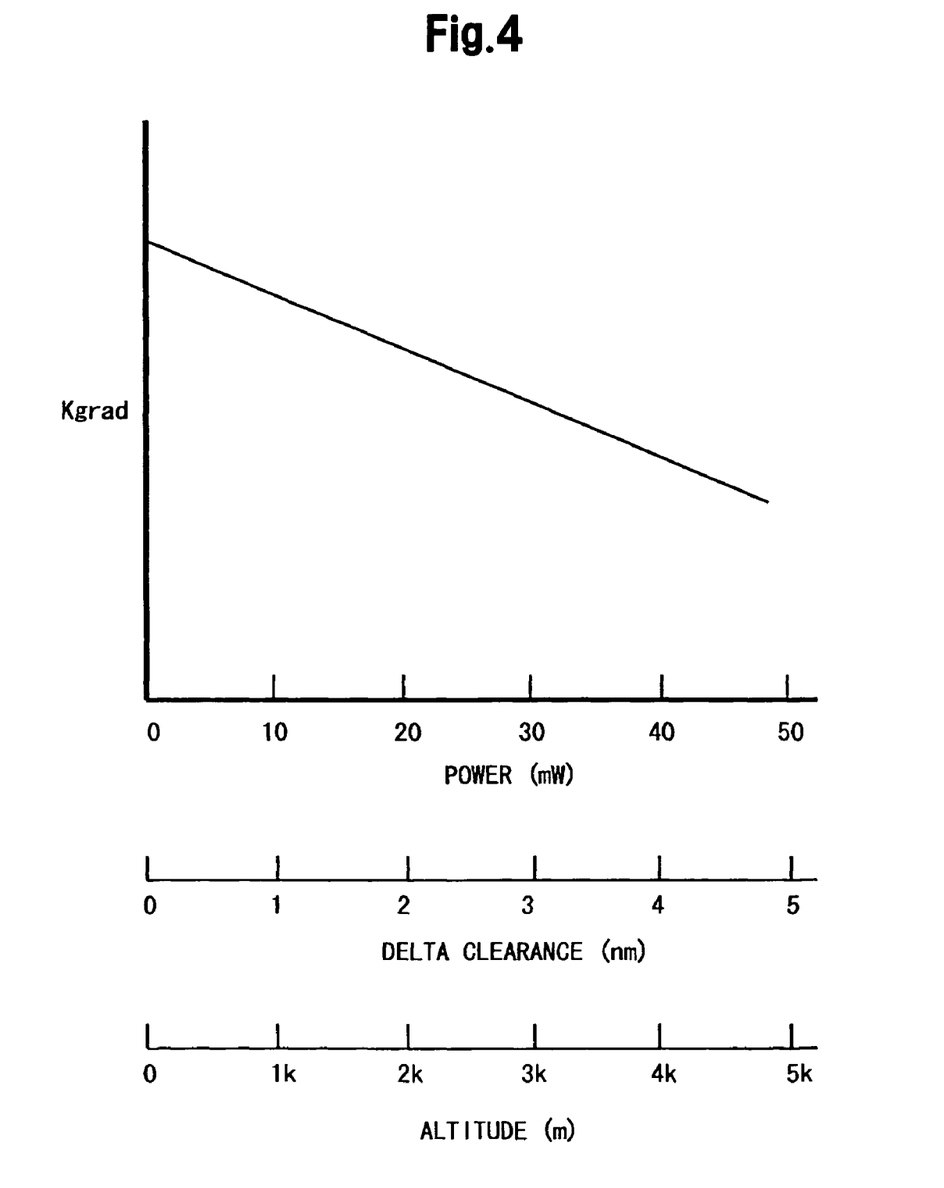
FIG. 4 is a drawing schematically showing the relationship between Kgrad and other values in one embodiment.

FIG. 4 schematically shows the relationship between Kgrad, clearance, heater power, and barometric pressure (altitude). Kgrad is the temperature-compensated value. As shown in FIG. 4, each of the above values has a linear relationship with each other. Accordingly, the HDC/MPU 23 can directly determine any of the values from other values and any of the values can express other values.

The HDC/MPU 23 performs compensation of the measured Kgrad with respect to temperature according to the following Formula 1:

$$Kgrad\_comp = Kgrad + term1 + term2 \quad \text{(Formula 1)}$$

Here, Kgrad_comp represents the temperature-compensated measured Kgrad; Kgrad, a measured value; and term1 and term 2, compensation terms defined by the sensed temperatures. The term1 is a function of the drive temperature and the term2 is a function of the difference between a measured channel temperature and a measured drive temperature. The HDC/MPU 23 determines the Kgrad variation caused by a pressure change from the difference between the Kgrad (Kgrad_iniNT) measured in a test (a test in the default conditions) at a normal temperature (NT) of the HDD 1 and Kgrad_comp.

Specifically, the compensation term term1 is expressed by the following Formula 2:

$$term1 = (Tdrive - Tdrive\_iniNT) \times ((Kgrad\_iniHT)' - Kgrad\_iniNT)/(Tdrive\_iniHT - Tdrive\_iniNT)) \quad \text{(Formula 2)}$$

Here, Tdrive represents a measured drive temperature, which is the temperature sensed by the temperature sensor 17; Tdrive_iniNT, a drive temperature in a test step of an HDD1 at a normal temperature; (kgrad_iniHT)', the value obtained by a compensation of a measured Kgrad in a test step of the HDD 1 at a higher temperature (HT) using the term2; Kgrad_iniNT, a measured Kgrad in a test step of the HDD 1 at a normal temperature; and Kgrad_iniHT, a drive temperature in a test step of the HDD 1 at a higher temperature.

The term1 compensates for both of the clearance variation and the channel property variation caused by a change in drive temperature. If the difference between the drive temperature and the channel temperature is the same as the value in the test of the HDD 1 at a normal temperature, the HDC/MPU 23 performs a temperature compensation of the measured Kgrad using the term1, but not using the term2.

The compensation term term2 is expressed by the following Formula 3:

$$term2 = ((Tch - Tdrive) - (Tch\_iniNT - Tdrive\_iniNT)) \times Slope\_kg \quad \text{(Formula 3)}$$

Here, Tch represents a measured channel temperature; Tch_iniNT, a measured channel temperature in the test step of the HDD 1 at a normal temperature; and Slope_kg, a compensation coefficient. In the following description, the difference between the channel temperature and the drive temperature will be represented by dT; and the difference between dT in the normal temperature test and dT at a pressure measurement, by δT. That is, the Formula 3 will be transformed to the following Formula 4:

$$term2 = \delta T \times Slope\_kg. \quad \text{(Formula 4)}$$

The term2 is a compensation term when δT is finite (dT at measurement of Kgrad for pressure measurement is different from dT in the normal temperature test). This compensation term is expressed by a linear function of δT. The compensation for the clearance variation has been performed by the term1, and the term2 compensates for the component defined by δT among the Kgrad variation caused by a channel property change. In the Formula 2, (Kgrad_iniHT)' is used to compensate for the difference (δT) between dTs in the high temperature test and in the normal temperature test.

Figure 5:
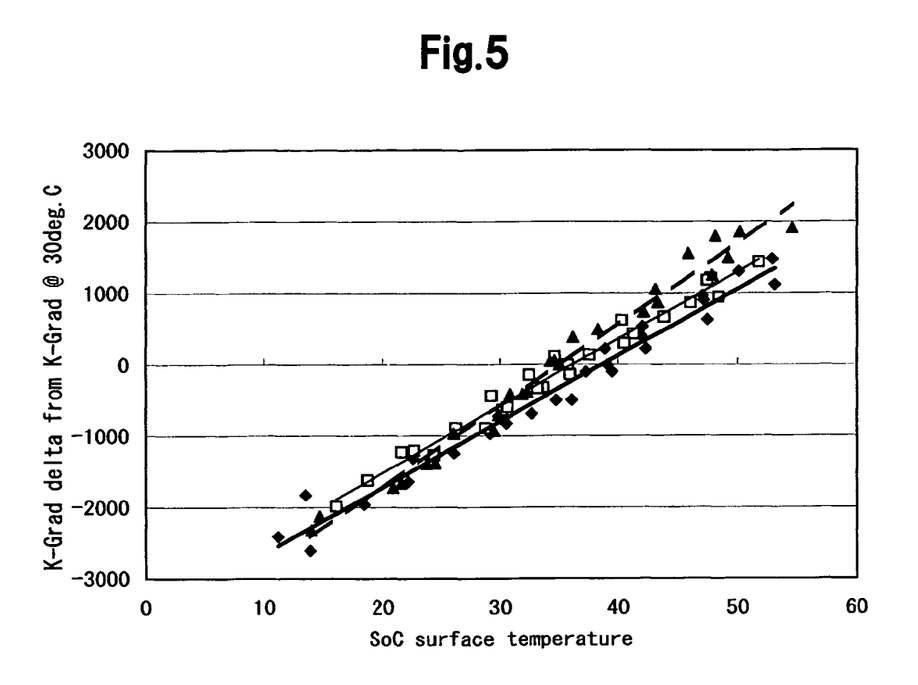
FIG. 5 shows the measured data of the surface temperature of the chip package of the RW channel and variation of Kgrad referring to the default Kgrad at 30° C. (a normal temperature) in one embodiment.

FIG. 5 shows the surface temperature of the chip package of the RW channel 21 and the measured data of Kgrad variation with reference to the Kgrad at 30° C. (a normal temperature). The drive temperature was maintained at 30° C. The measurements were conducted on three HDDs of the same design. This measurement data indicate that the relationship of the difference dT between the channel temperature and the drive temperature and Kgrad is approximated by a linear function.

Figure 6:
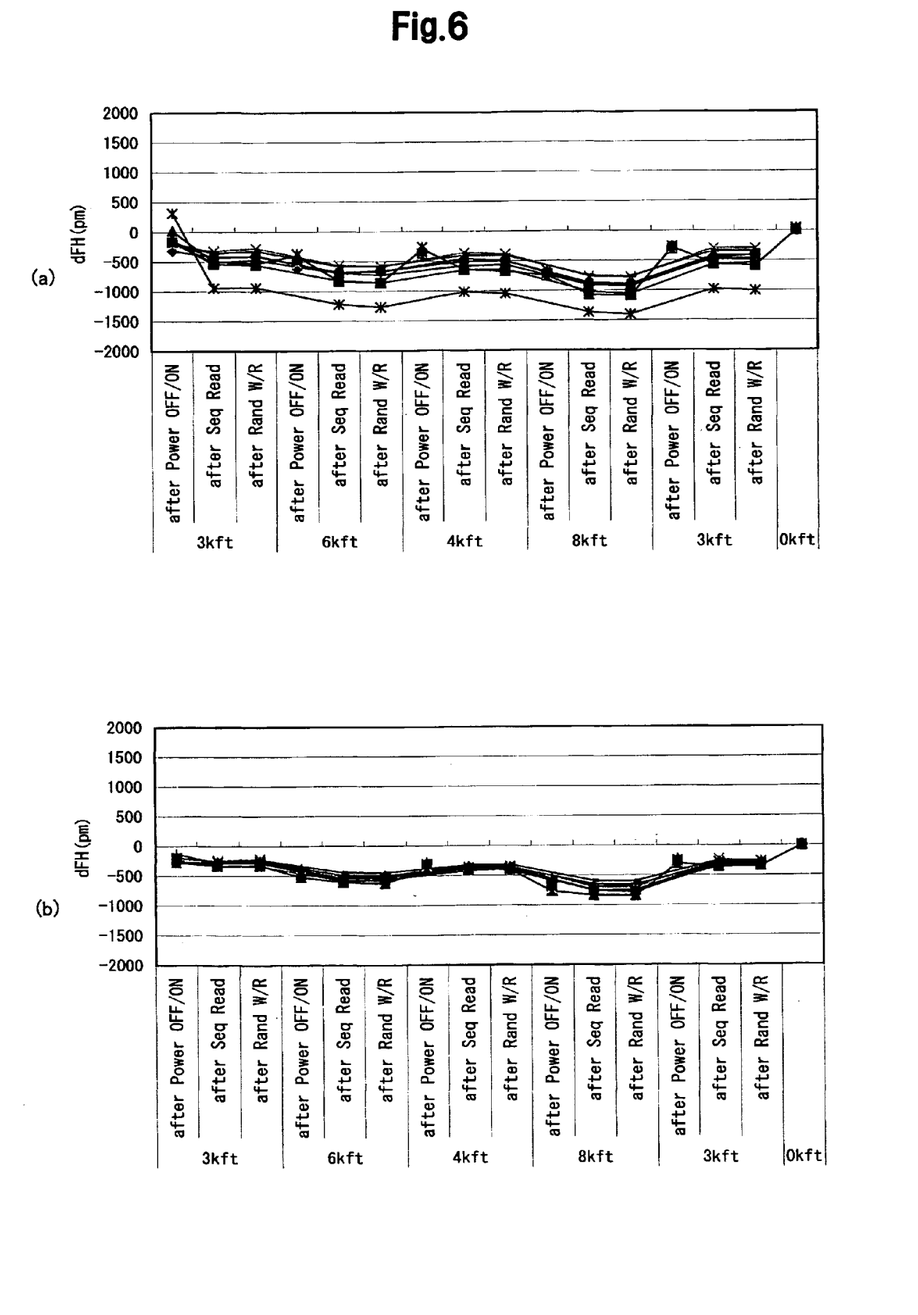
FIGS. 6(a) and 6(b) show the measured clearance when compensation with respect to the chip temperature has not been conducted and the measured clearance when compensation with respect to the chip temperature has been conducted.

FIGS. 6(a) and 6(b) show the effect of the compensation with respect to the chip temperature according to the present invention. FIG. 6(a) shows the measured clearance when the compensation with respect to the chip temperature was not conducted and FIG. 6(b) shows the measured clearance when the compensation with respect to the chip temperature was conducted. The measurements were made at timings after the start-up, a sequential read operation, and random read and write operations, at a plurality of altitudes (pressures). The measurements were conducted on a plurality of HDDs of the same design.

As shown in FIG. 6(a), if the compensation with respect to the chip temperature of embodiments of the present invention is not conducted, the measured clearance shows great variation at respective timings. In contrast, if the compensation has been conducted, variation in the measured clearance is small. FIG. 6(a) indicates the measured value varies depending on the difference in the chip temperature (the difference between the chip temperature and the drive temperature) at the respective timings, even if the drive temperature and the altitude are constant. FIG. 6(b) indicates that the measurement error caused by change in chip temperature (the difference between the chip temperature and the drive temperature) has been steadily compensated by the compensation method of embodiments of the present invention.

The Slope_kg in the above Formulae 3 and 4 are determined in a test step of the HDD 1. The test step of the HDD 1 determines the relationship between the heater power and the clearance, the relationship between the temperature and the clearance, and the relationship between the temperature-compensated Kgrad and the clearance to set and register the data indicating them in the HDD 1. The test on the HDD 1 is conducted by the HDD 1 itself. Specifically, the HDC/MPU 23 performs processes of the test step according to a test program downloaded from a test computer. A typical test conducts tests at a normal temperature and a higher temperature to measure necessary values and calculate coefficients.

In one example, an HDD 1 measures the channel temperature Tch, the drive temperature Tdrive, and Kgrad under two conditions in the test at a normal temperature to calculate Slope_kg from those values. The slope_kg is expressed by the following formula 5:

$$\text{Slope\_kg} = \left(\frac{\text{Kgrad\_1} -}{\text{Kgrad\_2}}\right) / \left(\left(\frac{\text{Tch\_1} -}{\text{Tdrive\_1}}\right) - \left(\frac{\text{Tch\_2} -}{\text{Tdrive\_2}}\right)\right) \quad \text{(Formula 5)}$$

$$= (\text{Kgrad\_1} - \text{Kgrad\_2})/(\text{dT\_1} - \text{dT\_2})$$

$$= (\text{Kgrad\_1} - \text{Kgrad\_2})/\delta T\_(1-2).$$

The suffixes of 1's in the Formula 5 represent the values under the first condition; and the suffixes of 2's, the values under the second condition. Particular examples of the first condition and the second condition are immediately after a data write from or data read to a magnetic disk 11 by a head slider 12 and immediately after the HDD 1's start-up (at the start-up), respectively. The channel temperature Tch just after the start-up is low and the channel temperature Tch just after a read/write is higher. The HDC/MPU 23 can determine the compensation coefficient Slope_kg according to the difference between the channel temperatures under these two conditions.

The compensation coefficient Slope_kg differs depending on the HDD 1 or the head slider 12. HDDs 1 may measure the compensation coefficient Slope_kg in the respective test steps in manufacture. However, to improve the manufacturing efficiency of HDDs 1, the same compensation coefficient Slope_kg may be set to the HDDs of the same design. For example, in designing and developing HDDs 1, measurements of Slope_kg's are conducted on a plurality of HDDs 1 and the average value is set to all of the HDDs 1 in the manufacturing step.

As a circuit 217 for the HDC/MPU 23 to measure the channel temperature, some particular circuits are considered. One of them measures the voltage between the base and the emitter of a MOS transistor. The chip temperature can be determined from the temperature property of this voltage. The RW channel 21 stores the voltage between the base and the emitter or the temperature calculated from the voltage in a register and the HDC/MPU 23 determines the chip temperature from the stored values in the register.

Another circuit for sensing the channel temperature is a ring oscillator. The output frequency (ring speed) of the ring oscillator varies with temperature. Specifically, as the chip temperature rises, the output frequency lowers. The RW channel 21 stores the output frequency of the ring oscillator in a register in the channel. The HDC/MPU 23 obtains the output frequency of the ring oscillator from the register and calculates the channel temperature from the value to measure the channel temperature. For more efficient circuit configuration, a circuit used in other usage may be used as the temperature sensing circuit for measuring the chip temperature. For example, the output frequency of the ring oscillator becomes an indicator for indicating performance such as power consumption and error rates so that it can be used in inspection on RW channels 21.

Hereinafter, an example where the HDC/MPU 23 measures the channel temperature using a ring oscillator will be explained. Between the output frequency Rs of the ring oscillator and the channel temperature Tch, the relationship in the following Formula 6 is established:

$$Tch = (Rs - Rs\_iniNT) \times \text{Slope\_Tch} + Tch\_iniNT. \quad \text{(Formula 6)}$$

Figure 7:
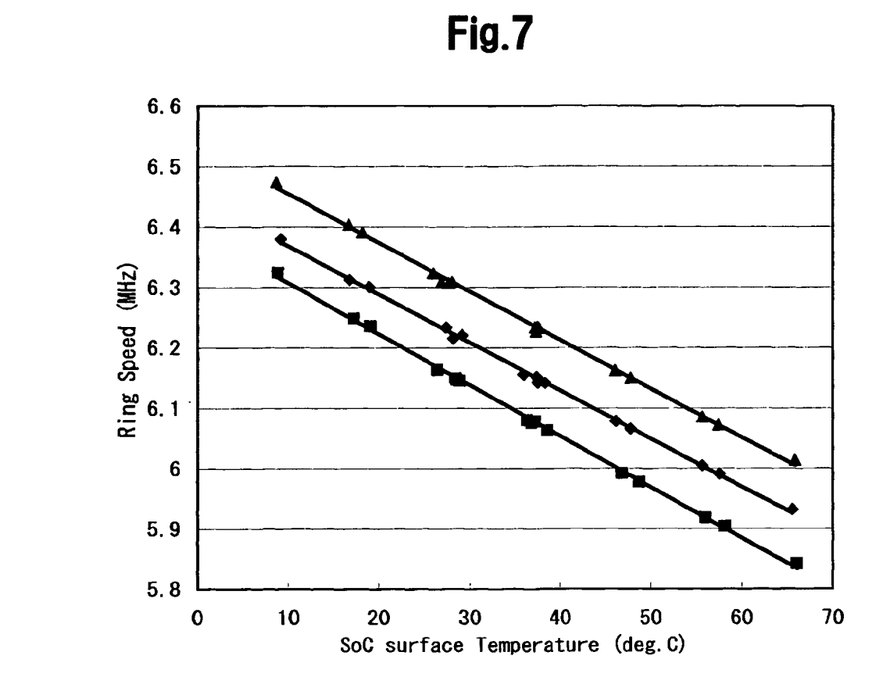
FIG. 7 shows the measured data indicating the relationship between the output frequency of the ring oscillator and the surface temperature of the RW channel package in one embodiment.

The relationship between the channel temperature and the ring oscillator's frequency is approximated by a linear function as expressed in Formula 6. FIG. 7 shows measurement data indicating the relationship between the output frequency of the ring oscillator and the package surface temperature of the RW channel 21. The X-axis represents the surface temperature of the package and the Y-axis represents the output frequency of the ring oscillator. Measurement has been conducted on a plurality of HDDs of the same design. The measured data in FIG. 7 indicate that the relationship between the ring oscillator's output frequency Rs and the channel temperature Tch can be approximated by a linear function.

Here, δT used in Formula 4 can be expressed by the following Formula 7 from Formula 6:

$$\delta T = (Tch - Tdrive) - \left(\frac{Tch\_iniNT-}{Tdrive\_iniNT}\right) \quad \text{(Formula 7)}$$

$$= \left(\frac{(Rs - Rs\_iniNT) \times Slope\_Tch +}{Tch\_iniNT - Tdrive}\right) -$$

$$\left(\frac{Tch\_iniNT-}{Tdrive\_iniNT}\right)$$

$$= \left(\frac{(Rs - Rs\_iniNT) \times Slope\_Tch +}{Tdrive\_iniNT}\right) - Tdrive.$$

Further, the following Formula 8 is established from Formulae 7 and 4:

$$term2 = \delta T \times Slope\_kg \quad \text{(Formula 8)}$$

$$= \left(\left(\begin{array}{c}(Rs - Rs\_iniNT) \times \\ Slope\_Tch + \\ Tdrive\_iniNT\end{array}\right) - Tdrive\right) \times Slope\_kg.$$

For compensation with respect to δT, the HDC/MPU 23 measures the ring oscillator's frequency Rs_iniNT and the drive temperature Tdrive_iniNT in the test step. Further, the HDC/MPU 23 determines the coefficient Slope_kg by measurement as described with reference to Formula 5 and determines Slope_Tch by measurement. In measuring Kgrad to measure a pressure variation, the HDC/MPU 23 measures the ring oscillator's frequency Rs and the drive temperature Tdrive and performs a compensation of the measured Kgrad with respect to δT using the above values and coefficients measured in the test step.

A method for determining the coefficient Slope_Tch uses measured drive temperatures and the channel temperatures in the normal temperature test and in the higher temperature test. The coefficient Slope_Tch is expressed by the following Formula 9:

Slope_Tch=(Tch_iniHT-Tch_iniNT)/(Rs_iniHT-Rs_iniNT) (Formula 9)

Here, Rs_iniHT is the ring oscillator's frequency at the higher temperature test. Assume that the difference between the drive temperature and the channel temperature is the same in the normal temperature test and in a higher-temperature test. This state can be attained by maintaining the HDD 1 at the respective temperatures for a sufficiently long time. If this condition is satisfied, Formula 9 can be rewritten by the following Formula 10:

Slope_Tch=(Tdrive_iniHT-Tdrive_iniNT)/(Rs_iniHT-Rs_iniNT). (Formula 10)

Accordingly, the HDC/MPU 23 measures the drive temperature in the normal temperature test and the higher temperature test using the temperature sensor 17 and further measures the frequency of the ring oscillator in the RW channel 21 to determine the coefficient Slope_Tch.

Since the coefficient Slope_Tch shows a different value in each HDD 1, the HDD 1 should determine the value by measurement. To improve manufacturing efficiency of HDDs 1, however, the same value of the coefficient Slope_Tch may be applied to HDDs 1 of the same design. For example, in designing and developing HDDs 1, Slope_Tch is measured on a plurality of HDDs 1 and the averaged value is set to all of the HDDs 1 in the manufacturing step.

Figure 8:
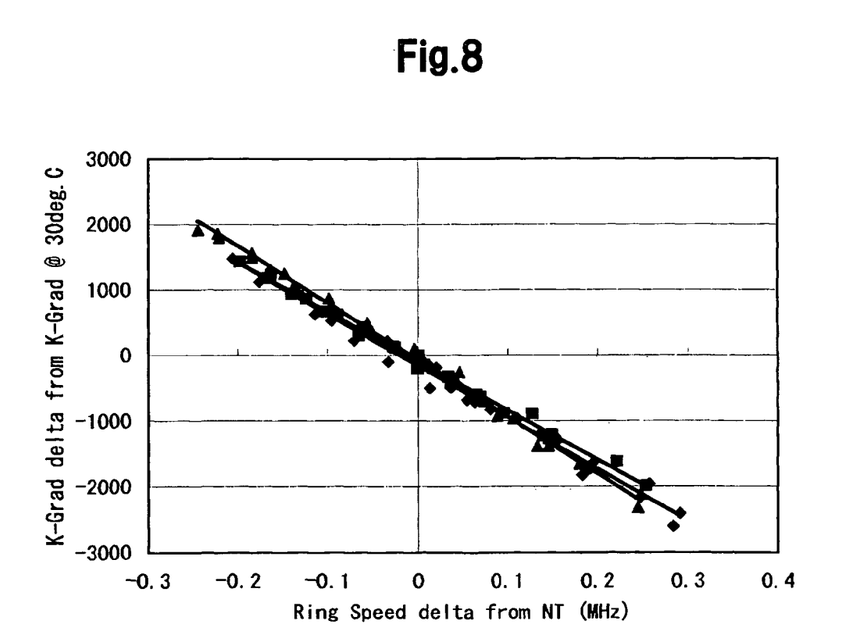
FIG. 8 shows the measured data indicating the relationship between the ring oscillator's frequency and Kgrad in one embodiment.
Figure 9:
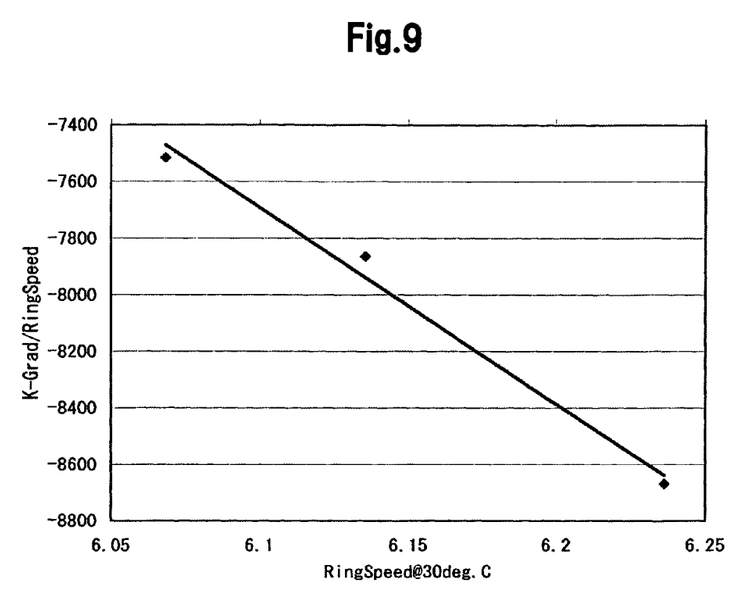
FIG. 9 shows the measured data indicating the relationship between the ring oscillator's frequency at 30° C. (normal temperature) and Kgrad/ring oscillator's frequency in one embodiment.

A particular method to improve the temperature compensation accuracy in the measured Kgrad while improving the manufacturing efficiency of HDDs 1 determines the coefficient Slope_kg utilizing the mutual relationship between the coefficient Slope_kg and the ring oscillator's frequency Rs_iniNT. FIG. 8 shows measurement data indicating the relationship between the ring oscillator's frequency and Kgrad. The X-axis represents variation in the ring oscillator's frequency from a state at 30° C. (a normal temperature) and the Y-axis represents variation in the measured Kgrad from a state at 30° C. (a normal temperature). The drive temperature under measurement is constant. FIG. 9 shows measurement data indicating the relationship between the ring oscillator's frequency at 30° C. (a normal temperature) and Kgrad/ring oscillator's frequency. As understood from the measurement data in FIG. 9, the relationship between the two values can be approximated by a linear function. In this way, the coefficient Slope_kg and the ring oscillator's frequency Rs_iniNT have a mutual relationship therebetween.

In one example, the HDC/MPU 23 calculates the coefficient Slope_kg using the ring oscillator's frequency in the normal temperature test Rs_iniNT and a preset function. The coefficient Slope_kg can be expressed by a linear function of the measured ring oscillator's frequency Rs_iniNT. For example, Slope_kg can be expressed as (A×Rs_iniNT). In an HDD 1, a function determined in the design step has been preliminarily registered and the HDC/MPU 23 can obtain the coefficient Slope_kg close to the actual value by substituting the ring oscillator's frequency Rs_iniNT measured in the normal temperature test for the function.

As set forth above, the present invention has been described by way of a particular embodiments but is not limited to the above embodiments. A person skilled in the art can easily modify, add, and convert each element in the above embodiments within the scope of the present invention. Embodiments of the present invention can compensate for an error in a measured clearance caused by a property change of the RW channel using the drive temperature and the channel temperature and the specific compensation method by those measured temperatures is not limited to the above embodiments. Furthermore, embodiments of the present invention may be applied to HDDs which have implemented head sliders having read elements only, or disk drive devices other than HDDs. Embodiments of the present invention can be applied to HDDs having a clearance control mechanism different from the TFC. The default temperature for the compensation of embodiments of the present invention is not limited to a normal temperature.

HDDs may determine the coefficient to be used in the temperature compensation of the measured clearance by measurement at the start-up, or while idling even after product delivery. Embodiments of the present invention are applicable in compensation of a channel parameter indicating the resolution, such as Kgrad, but may be applied to compensation of the measured values of other channel parameters. Embodiments of the present invention are applicable in compensation of digital values at a post-step of the waveform equalization filter in the RW channel, but may be used in compensation of other values in the RW channel. The circuit to measure the temperature in the vicinity of the RW channel may be implemented in the chip of the RW channel, but may be implemented outside the chip. In such a case, the temperature sensing circuit to measure the chip temperature (the temperature in the vicinity of the RW channel) is implemented closer to the RW channel than the temperature sensing circuit to measure the drive temperature.

What is claimed is:

1. A disk drive device comprising:
    a disk;
    a head to access the disk;
    a channel circuit to decode read signals reproduced from the disk by the head;
    a first circuit utilized in sensing a first temperature in an enclosure;
    a second circuit utilized in sensing a second temperature in a vicinity of the channel circuit; and
    a controller to perform a compensation of a parameter in processing the read signals in the channel circuit using the first temperature and the second temperature, and to measure a clearance between the head and the disk using the compensated parameter.

2. The disk drive device according to claim 1, wherein the controller compensates for variation in the parameter corresponding to a temperature change of frequency property of the channel circuit by the compensation of the parameter.

3. The disk drive device according to claim 2, wherein a coefficient to be used in the compensation of the parameter is determined by a test under at least two temperature conditions.

4. The disk drive device according to claim 2, wherein the parameter is a parameter representing resolution of the signals reproduced from the disk by the head.

5. The disk drive device according to claim 1, wherein the parameter is a parameter in digital signal processing in the channel circuit.

6. The disk drive device according to claim 1, wherein the controller determines the second temperature using an output of the second circuit and a preset function.

7. The disk drive device according to claim 6, wherein
    the second circuit comprises a channel oscillator; and
    the output of the second circuit comprises an oscillation frequency of the channel oscillator.

8. A disk drive device comprising:
    a disk;
    a head accessing the disk;
    a channel circuit decoding read signals reproduced from the disk by the head;
    a first circuit utilized in sensing a first temperature in an enclosure;
    a second circuit utilized in sensing a second temperature in a vicinity of the channel circuit; and
    a controller performing a compensation of a parameter in processing the read signals in the channel circuit using the first temperature and the second temperature and to measure barometric pressure using the compensated parameter.

9. The disk drive device according to claim 8, wherein the controller compensates for variation in the parameter corresponding to a temperature change of frequency property of the channel circuit by the compensation of the parameter.

10. The disk drive device according to claim 9, wherein a coefficient to be used in the compensation of the parameter is determined by a test under at least two temperature conditions.

11. The disk drive device according to claim 9, wherein the parameter is a parameter representing resolution of the signals reproduced from the disk by the head.

12. The disk drive device according to claim 8, wherein the parameter is a parameter in digital signal processing in the channel circuit.

13. The disk drive device according to claim 8, wherein the controller determines the second temperature using an output of the second circuit and a preset function.

14. The disk drive device according to claim 13, wherein
    the second circuit comprises a channel oscillator; and
    the output of the second circuit comprises an oscillation frequency of the channel oscillator.

15. A disk drive device comprising:
    a disk;
    a head equipped with a heater for accessing the disk;
    a channel circuit decoding read signals reproduced from the disk by the head;
    a first circuit utilized in sensing a first temperature in an enclosure;
    a second circuit utilized in sensing a second temperature in the vicinity of the channel circuit; and
    a controller performing a compensation of a parameter in processing the read signals in the channel circuit using the first temperature and the second temperature and determining a heater power to be supplied to the heater when the head accesses the disk based on a barometric pressure which was measured by use of the compensated parameter.

16. The disk drive device according to claim 15, wherein the controller compensates for variation in the parameter corresponding to a temperature change of frequency property of the channel circuit by the compensation of the parameter.

17. The disk drive device according to claim 16, wherein a coefficient to be used in the compensation of the parameter is determined by a test under at least two temperature conditions.

18. The disk drive device according to claim 16, wherein the parameter is a parameter representing resolution of the signals reproduced from the disk by the head.

19. The disk drive device according to claim 15, wherein the parameter is a parameter in digital signal processing in the channel circuit.

20. The disk drive device according to claim 15, wherein the controller determines the second temperature using an output of the second circuit and a preset function.

21. The disk drive device according to claim 20, wherein
    the second circuit comprises a channel oscillator; and
    the output of the second circuit comprises an oscillation frequency of the channel oscillator.

* * * * *